July 28, 1953 — C. B. BUKER — 2,646,679

DEVICE FOR BEND TESTING SHEETS

Filed July 20, 1951 — 2 Sheets-Sheet 1

INVENTOR
Charles B. Buker
by Hoopes, Leonard & Glenn
his attorneys

July 28, 1953  C. B. BUKER  2,646,679
DEVICE FOR BEND TESTING SHEETS
Filed July 20, 1951 2 Sheets-Sheet 2
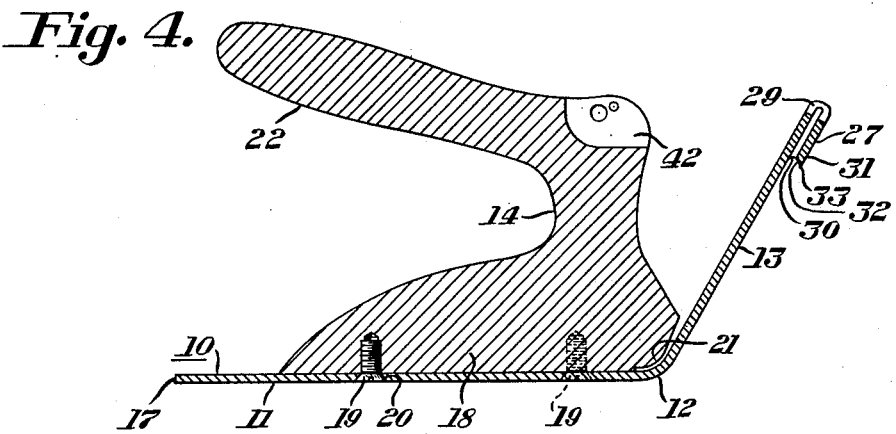
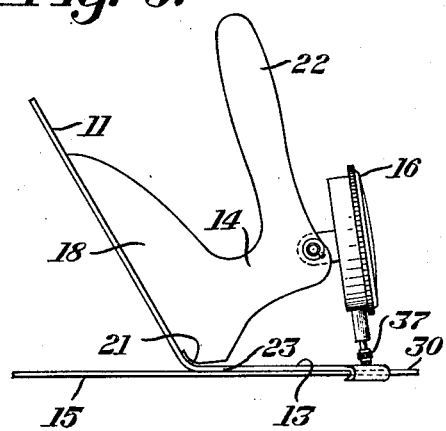
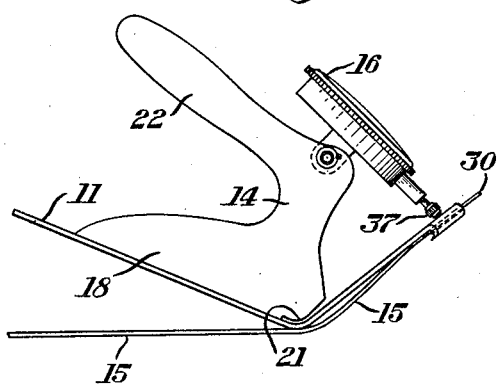
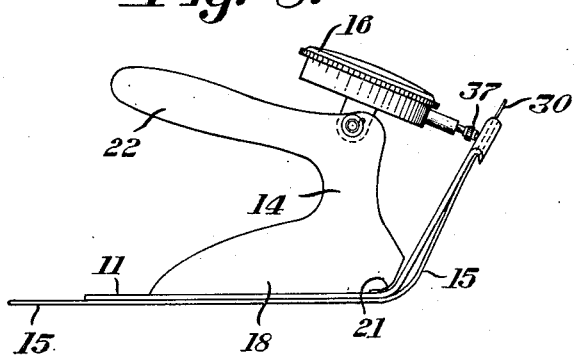
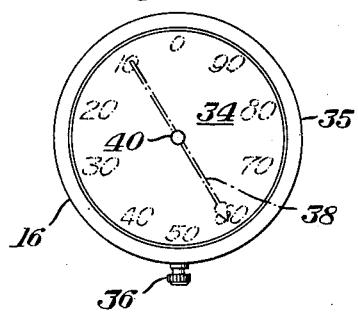
INVENTOR
Charles B. Buker
by Hoopes, Leonard & Glenn
his attorneys.

Patented July 28, 1953

2,646,679

UNITED STATES PATENT OFFICE 2,646,679

DEVICE FOR BEND TESTING SHEETS

Charles B. Buker, Birmingham, Mich., assignor to Jones & Laughlin Steel Corporation, Pittsburgh, Pa., a corporation of Pennsylvania Application July 20, 1951, Serial No. 237,775

11 Claims. (Cl. 73—100)

This invention relates to a device for comparatively testing metal sheets by bending them. More particularly, it relates to a non-destructive stiffness quality tester for rolled ferrous sheets used in various forming operations.

In production forming operations using sheets of a material like cold rolled steel, there is a need for a relatively fast testing mode to give some indication of the forming qualities of the metal sheets to be used in such operations. In the case, for example, of stamping and drawing operations, considerable attention is paid to the hardness and ductility of the sheets and frequently also to the aging. While there are a number of testers that have been developed including hardness testers, such as the Rockwell tester, and ductility testers, such as the Olsen cup tester, there remained the difficulty that such laboratory tests are time consuming and sometimes destructive.

By means of the new device of this invention, there is provided a portable non-destructive tester which is rapid in operation and can be used right in the shop where the forming operations are to be preformed. In functioning, this new tester device is comparative and can readily be calibrated against a sheet of known suitability for the forming operation to be undertaken. The indications given by the new tester will in many cases provide sufficient assurance for use of the metal sheets or indicate the need for certain trial experiments prior to initiating fabricating operations. Thus, in the case of aging steels the new tester may be used to indicate the need for or the results of, roller level passing to suppress the yield point and avoid upon drawing, for example, stretcher straining.

In addition, the structure of the new tester enables the respective metal sheets to be tested to be readily engaged and the comparative indications of each thereof to be observed. The precise duplication by the new tester of the testing operation on each metal sheet or the like to which it is applied removes a great deal of the guesswork involved formerly in considering the suitability of such sheets in the shops where they were to be formed. Likewise, the calibration operation itself is substantially the same operation as the testing operation. Further, many of the principal parts of the new tester are relatively inexpensive both in initial cost and in the construction and assembly of the tester. Other objects and advantages of this invention will be apparent from the following description and from the drawings, which are illustrative only, in which, Figure 1 is a side view of a new tester embodying this invention;

Figure 4 is a view in section taken along line IV—IV of Figure 2, with the gauge removed;

Figure 5 is a view of the face of the dial gauge illustrating a calibrating reading thereon;

Figure 6 shows the new tester just after it has been placed in engagement with a metal sheet to be tested;

Figure 7 shows the tester of Figure 6 being rolled in the course of a testing operation; and Figure 8 shows the new tester of Figures 6 and 7 in its final testing position at which the indication of the dial gauge is read.

Figure 1:
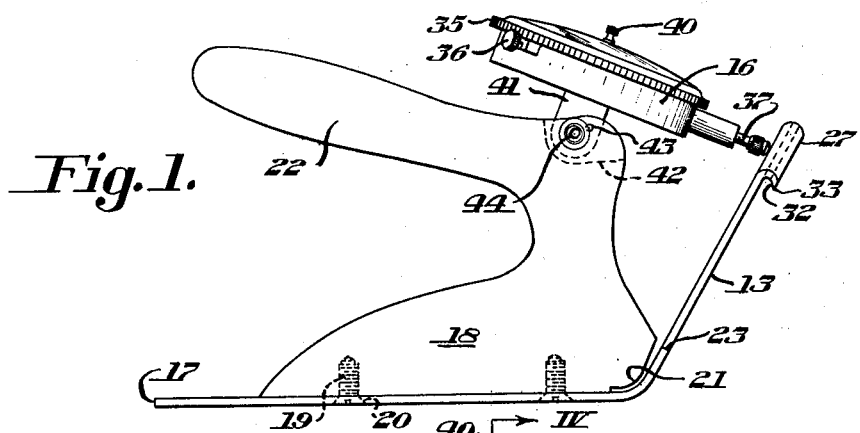

Referring to the drawings, a single flat plate 10 of a suitable material is bent into the form of an angle. 18–8 stainless steel may be cut or stamped to the requisite outline while flat and then bent into the form of an angle, or it may be bent and then shaped. In its final form, plate 10 comprises a base portion 11 and an angle or roll portion 12 and a resilient tongue portion 13. A rigid handle 14 is affixed to base 11 to enable plate 10 after engagement with a metal sheet 15 to be rolled on that metal sheet 15 from a position in which tongue 13 is approximately parallel to the sheet as an entirety to the position in which base 11 is in contact with the body of the sheet as shown sequentially in Figures 6 to 8 inclusive. Such rolling is done on the exterior of the roll portion or angle 12. A dial gauge 16, in the embodiment shown, is rigidly mounted on and connected to handle 14 and bears against the inner or upper side of tongue 13. By means of dial gauge 16 or any other suitable deflection indicator, any change in the angle between tongue 13 and base 11 in the course of a testing operation as shown in Figures 6 to 8, will be indicated.

Base 11 is relatively broad and extends rearwardly as an integral continuation of roll 12 that being the cylindrical portion on the exterior of which the new tester of this invention is pivoted in the course of its operative use as shown in Figures 6 to 8. Edge 17 of base 11 may be rounded off at the rear and tapered inwardly along the sides as it extends to the rear of base portion 11. Handle 14 is provided with a lower portion or stand 18 the underside of which is flat and covers a relatively extensive area on the top of base portion 11. The area covered by stand 18 is extensive enough and the stand is massive enough to prevent any flexure of base 11 in any material amount in the operation of the new tester. Stand 18 is rigidly affixed to base 11 by, for example, machine screws 19 having countersunk heads which fit into countersunk recesses 20 drilled in the underside of the base portion 11.

A lower front surface 21 on stand 18 is spaced to the rear of and generally follows the curvature of the inside of roll portion 12. By means of such spacing between angle 12 and surface 21 there is no interference with the flexure of tongue 13 and, further, the manufacture of the new tester of this invention is simplified inasmuch as precise correspondence in the respective curvatures of angle 12 and surface 21 is not required. Moreover, the change which may take place in testing in the included angle between base 11 and tongue 13 can thereby be accommodated around the elements of roll portion or angle 12 and are not necessarily confined to tongue portion 13 itself. In such manner, the life of the new tester may be increased by avoidance of relatively localized fatigue occurring in the course of constant use. A rearwardly extending grip 22 integral with stand 18 in handle 14 enables an operator to conveniently and readily bend a metal sheet to be tested by means of the new tester of this invention.

Angle 12 also in a sense constitutes an upwardly and forwardly extending front edge of base portion 11 terminating at edge 23. Thereby, the bight of angle 12 connects the relatively flat broad base portion 11 and the relatively flat narrow tongue portion 13. Tongue portion 13 is relatively narrow by virtue of the lateral and inwardly cut out portions forming the edge 23. As edge 23 extends inwardly from each side of plate 10 it merges respectively into a fillet 24 which in turn extends upwardly and forms the sides 25 of tongue portion 13. As a general rule, sharp corners are to be avoided in constructing the new tester to prevent the possibility of creating weakness areas.

The flat portions respectively constituting base 11 and tongue 13 extending on each side of the bight of roll portion 12 have an included angle between them, which may be approximately 120°, when measured from the base portion 11 to the tongue portion 13 in a clockwise direction as viewed in Figure 1. The relative narrowness of tongue portion 13 between the sides 25 is purposely provided to increase the relative ease with which the flexure thereof may be obtained. In such flexure of tongue portion 13 and whatever elements of angle portion 12 are involved, the elastic limit of the metal of which plate 10 is made is not exceeded, and usually, not even approached. Hence, the resilience of such metal will return the flexed portions to their original position after the discontinuance of each testing operation.

Figure 2:
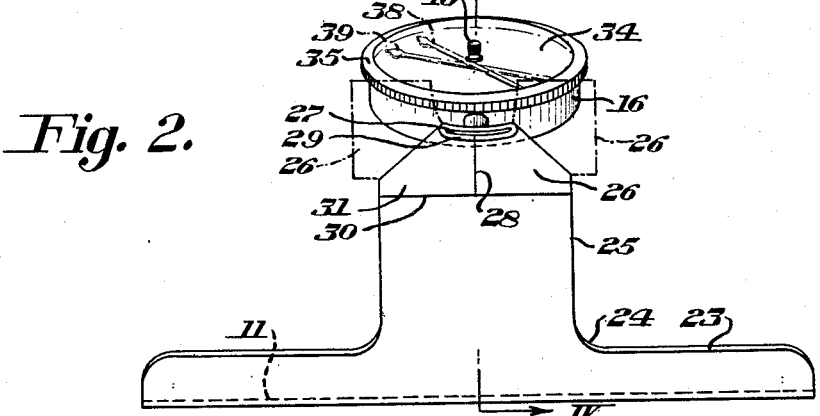
Figure 2 is a front view of the new tester illustrated in Figure 1.
Figure 3:
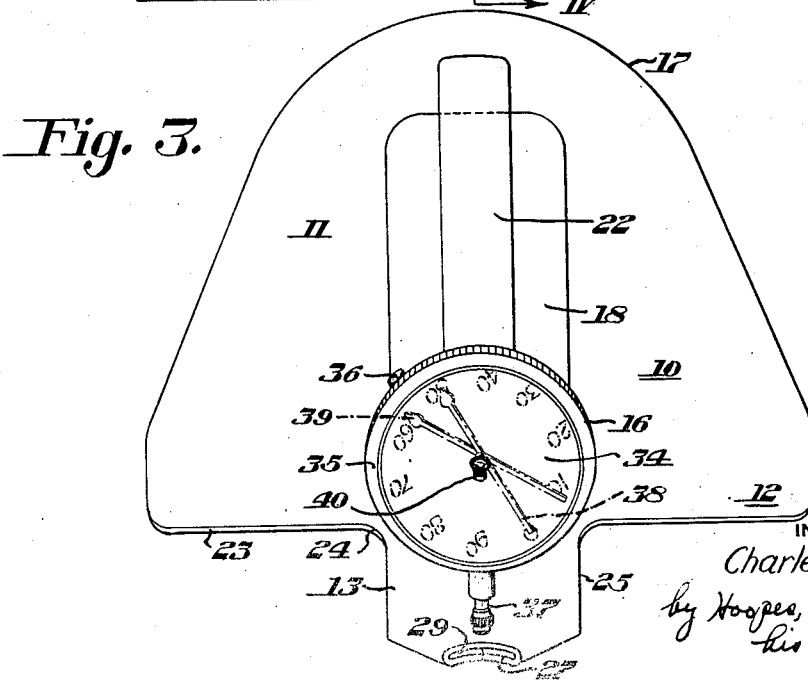
Figure 3 is a plan view of the new tester illustrated in Figure 1.

The end of tongue portion 13 away from base 11 is provided with integral wings 26 which extend generally laterally and outwardly as shown by the dotted outlines in Figure 2 before forming them into a clasp or pocket 27 in the construction of the new tester of this invention insofar as the embodiment shown in the drawings is concerned. It will be evident that other forms of fastening devices may be used which are either integral with tongue portion 13 or affixed thereto.

In forming pocket 27 each wing 26 is bent through a reentrant angle so that the outer edges 28 of the wings 26 approach each other. As shown in Figure 2, such edges 28 may be joined, and if desired, may be welded together. In course of bending the wings 26 the one side of each thereof on the inside of pocket 27 is brought into opposed relation relative to the under or outer side of tongue portion 13. Thereby, pocket 27 is provided with a space on the inside thereof having a thickness equal to the distance between the opposed outer side of the body of tongue 13 and the inner side of the wings 26 facing that outer side. Such thickness is of sufficient dimension to accommodate whatever thickness of metal sheet it is desired to have the new tester test. Generally speaking, each new tester will be constructed so as to test metal sheets of a materially lesser thickness than the thickness of the metal used in making plate 10 as will be well understood by those to whom this disclosure is made.

The upper end 29 of pocket 27 is open so that the corner 30 of a metal sheet such as metal sheet 15 may project therethrough. The lower side 31 of pocket 27 is also open so that the new tester can be slipped over corner 30 in the manner illustrated in Figures 6 to 8. The lower edge of the wings 26 along the outer side of the lower side 31 of pocket 27 are bevelled. Such bevel 32 begins on the inside of pocket 27 and extends downwardly and outwardly providing a relatively sharp edge 33 to facilitate the ease with which the new tester can be applied. As will be well understood by those skilled in the art, the new tester may be modified so that instead of being operative on the corner of a metal sheet, it may be operative along a straight portion or on irregular edges of blanked shapes. A different form of clasp, such as a hook, might be provided in such case on the under or outer side of tongue portion 13.

Dial gauge 16 may be a conventional deflection indicator such as those manufactured by B. C. Ames Co., of Waltham, Massachusetts, and in such an indicator there may be provided a dial 34 which is rotatably adjusted by a setting ring 35 locked in place by a lock screw 36. Dial 34 may be divided into radial divisions, each division, for example, indicating one one-thousandth of an inch of movement of a stem 37. Stem 37 bears against the inner or upper side of tongue portion 13 and is generally positioned relatively normally thereto. A spring or other device inside dial gauge 16 urges movable stem 37 outwardly against tongue portion 13 at all times. Hence, as the angle between base 11 and tongue 13 is changed in the course of a testing operation, as illustrated in Figures 6 to 8, a hand 38 will move around dial 34 to indicate the deflection or flexure which takes place in tongue portion 13. A maximum reading hand 39 may also be provided in pivoted relation to the glass covering dial 34 to be moved by hand 38. The maximum reading hand 39 is simply a precaution in the event that the tester should inadvertently be disengaged from the sheet being tested before a reading is taken of the final position of hand 38. A knob 40 may be used to reset maximum hand 39 toward the zero point whenever a new test is to be made. Upon disengagement of the new tester of the sheet being tested hand 38 will return to zero substantially. Precise adjustment of the zero mark on the dial 34 and hand 38 between testing operations can be obtained by unlocking and turning setting ring 36.

An integral lug 41 extends rearwardly from dial gauge 16 and fits between the sides of a recess 42 at the front end of handle 14. A dowel 43 and a bolt 44 pass entirely through both sides of recess 42 and lug 41 to rigidly connect dial gauge 16 to handle 14 and thence to base portion 11. The respective engagement by the deflection indicator 16 of tongue portion 13 and base portion 11 respectively to indicate any change in the angle therebetween may be provided in a number of ways which will be understood by those skilled in the art. In the calibration of the new tester, a suitably formable sheet of metal of the gauge and composition of the metal sheets to be tested is used. Such reference sheet when tested may for example, as shown in Figure 5, give a dial reading on dial 34 of sixty. In that case, applying the new tester successively to the new sheets of like gauge and composition will, when they indicate, for example, readings between 55 and 65, show an operator right in the shop before the forming operation is to be performed, that there is considerable likelihood that such sheets will perform satisfactorily in the course of their being formed. With metals which age such as low carbon rimmed steels, due account will be taken of any aging which may have taken place between time of receipt and moment of fabrication.

In the operation of the new tester device of this invention, the pocket 27 is slipped over the corner of a metal sheet to be tested. In that position, as shown in Figure 6, tongue portion 13 is generally parallel to the entire sheet. An operator grasps grip 22 and preferably with a slow steady pull rolls the new tester over the metal sheet about the exterior of angle 12 as a pivot until the underside of base portion 11 comes to rest on that sheet. The maximum deflection indicated as shown by indicator 16 is taken as a measure of the change in the angle between base 11 and tongue 13. That indication in turn is a measure insofar as appears of a stiffness quality of a metal sheet being tested. Since the new tester is calibrated against a comparable metal sheet, which is of known suitability and may be termed a reference sheet, the reading in the case of the reference sheet can readily be compared by the operator with the reading in the case of the other such sheets being tested. Thereby, he has a convenient and readily available indication of the stiffness quality of the sheet with elements of the hardness and ductility characteristics thereof. If the reading from any sheet being tested is too far from the reading obtained from the reference sheet, then the operator knows that the tested sheet or the particular batch of sheets must be further investigated for their suitability for forming in his particular operation. Further, in testing by means of the new device of this invention each sheet is tested across the grain on a diagonal thereby obtaining an indication of the stiffness quality which in the case of cold rolled ferrous sheets, may be an average of the stiffness quality shown had the indication been taken either in the direction of rolling or directly transverse thereto.

Moreover, the tester is uniform in its operation inasmuch as each sheet is tested by being rolled substantially through the same angle. Hence, the new tester conveniently and rapidly affords some indication of whether a series of metal sheets being tested will give relatively uniform and duplicate results in the forming thereof. By way of example and not limitation, one tester which has been made in accordance with this invention utilized a stainless steel plate, ⅛ inch in thickness which had the standard 18% chromium and 8% nickel alloying ingredients in its composition. The diameter of the curved portion of the angle between the base and tongue portion of that tester was about 1 inch and the included obtuse angle between those portions was about 120 degrees. The tongue portion 13 had a width of about 3 inches and the length measured normally thereto of base portion 11 was about 8½ inches with the other dimensions in the general correspondence shown in the drawings. A clearance of about one one-sixteenth of an inch was provided between the inner side of the angle 12 and the front lower surface 21 of the handle. Steel sheets satisfactorily tested by the device mentioned in the example, included sheets as thick as about 16 U. S. standard gauge. Such testing was non-destructive and after the new tester was disengaged from the metal sheet being tested there was considerable spring back of the corner which had been bent in the testing operation.

The degree of spring back in testing low carbon steels is an indication as to the amount of temper or cold work remaining in a steel at that moment. This degree may be determined with the use of a spherometer to measure the radius of the arc remaining after spring back. For example, tests may indicate that for a radius of three inches the yield point is substantially entirely eliminated. At a later date a test of the same steel may show a two and one-half inch radius indicating a partial return of the yield point with age. As the yield point is a governing factor in controlling the susceptibility of a steel to stretcher straining, the new tester thus also affords a quick non-destructive mode of determining the likelihood of the occurrence of this phenomenon.

As will be understood, new testers may be made to embody the teachings of this invention which are of far different sizes, shapes and dimensions. Various other modifications may be made in the structure of this invention without departing from the spirit thereof or the scope of the appended claims.

I claim:

1. A tester for metal sheets or the like, comprising in combination, a flat broad base, a flat narrow tongue affixed to said base at an angle thereto, said tongue being subject to flexion, a clasp connected to said tongue adjacent the end thereof away from said base, a rigid handle affixed solely to said base, and means respectively engaging said tongue and said base to indicate any change in the angle therebetween.

2. A tester for metal sheets or the like, comprising in combination, a flat broad base, said base having an upturned forward edge generally convex outwardly, a flat narrow tongue affixed to said base, said tongue being resilient and at an angle to said base, a rigid handle affixed to said base, means adjacent the end of said tongue away from said base to engage a metal sheet or the like, and means to indicate any change of position of said tongue relative to said base.

3. A tester for metal sheets or the like, comprising in combination, a plate having a base portion, an arcuate portion and a tongue portion, said base and tongue portions being in flexural relation, said arcuate portion connecting said base portion and said tongue portion, means adjacent the end of said tongue portion away from said base portion to engage a metal sheet or the like, means for moving said plate about said arcuate portion until said base portion rests on said metal sheet or the like, and means for indicating any change in the angle between said base portion and said tongue portion.

4. A tester for metal sheets or the like, comprising in combination, a plate having a base portion and a tongue portion at an angle to each other, said tongue portion being flexural relative to said base portion to change said angle, a clasp adjacent the end of said tongue portion away from said base portion to engage a metal sheet or the like, operating means attached to said plate for moving said plate on said metal sheet or the like about the outside of said angle to move said base portion into contact with said metal sheet or the like, and a flexure indicator connected to one portion to indicate any change in the angle due to such flexure between said last-mentioned portion and the other portion.

5. A tester for metal sheets or the like, comprising in combination, a plate having a base portion and a resilient tongue portion, said base portion and said tongue portion being at an angle to each other and connected by a rounded portion, a clasp connected to said tongue portion adjacent the end away from said base portion, a handle affixed to said base and extending generally normal to the axis of said rounded portion, said handle having a sufficient area in contact with said base portion to prevent substantial flexure of said base portion, and a deflection indicator in engagement with said base portion and said tongue portion to indicate any change in the angle therebetween.

6. A tester for metal sheets or the like, comprising in combination, a single plate of elastic material forming an obtuse angle, the flat portion on one side of the bight of said angle being a base portion, the flat portion on the other side of the bight of said angle being a tongue portion, a rigid handle connected to said base portion over an extensive era thereof, said handle generally normal to said bight, a clasp on said tongue portion to engage a metal sheet or the like when said tongue portion is generally parallel to said metal sheet or the like, and a deflection indicator rigidly connected to said handle and resting against said tongue portion, whereby when said tester is moved about the exterior of said bight to cause said base portion to approach parallelism with said metal sheet or the like, said indicator will indicate the change in said angle between said base portion and said tongue portion.

7. A tester for metal sheets or the like, comprising in combination, a single plate of elastic material forming an obtuse angle, the flat portion on one side of the bight of said angle being a base portion, the flat portion on the other side of the bight of said angle being a tongue portion, a rigid handle connected to said base portion over an extensive area thereof, said handle generally normal to said bight, said handle having a front surface adjacent but spaced from said bight, a clasp on said tongue portion to engage a metal sheet or the like when said tongue portion is generally parallel to said metal sheet or the like, and a deflection indicator rigidly connected to said handle and resting against said tongue por-
tion, whereby when said tester is moved about the exterior of said bight to cause said base portion to approach parallelism with said metal sheet or the like, said, indicator will indicate the change in said angle between said base portion and said tongue portion.

8. A tester for metal sheets or the like, comprising in combination, a flat base, a flat resilient tongue affixed to said base at an angle thereto, said tongue having lateral wings adjacent the end thereof away from said base, said wings forming opposed reentrant angles with the outer edges thereof adjacent to one another and spaced from the body of said tongue to form a clasp for a metal sheet or the like, a rigid handle affixed to the flat portion of said base, and means respectively engaging said tongue and said base to indicate any change in the angle therebetween.

9. A tester for metal sheets or the like, comprising in combination, a flat base, a flat resilient tongue affixed to said base at an angle thereto, said tongue having lateral wings adjacent the end thereof away from said base, said wings forming opposed reentrant angles with the outer edges thereof adjacent to one another and spaced from the body of said tongue to form a clasp for a metal sheet or the like, the bottom edge of said wings being beveled, a rigid handle affixed to the flat portion of said base, and means respectively engaging said tongue and said base to indicate any change in the angle therebetween.

10. A tester for metal sheets or the like, comprising in combination, a base and a tongue for said tester attached together at an angle and in flexural relation to one another, an arcuate portion on said tester having its curved surface extending transversely between the exterior of said base and said tongue, a clasp on said tongue to engage a metal sheet or the like, a handle affixed to said base to rotate it about said arcuate portion on said metal sheet or the like until said base engages said metal sheet or the like, and an indicator in respective engagement with said base and said tongue to measure the extent of any such flexure changing the angle between said base and said tongue.

11. A tester for metal sheets or the like, comprising in combination, base portion, a tongue portion rigidly affixed to said base portion at an angle thereto, at least said tongue portion being subject to flexion, means connected to said tongue portion to clasp a metal sheet or the like, operating means affixed solely to said base portion to move said base portion into contact with said metal sheet or the like about the outside of said angle after said first-named means has engaged a metal sheet or the like, and means respectively engaging base and tongue portions to indicate any change in said angle due to such flexion in the course of such movement.

CHARLES B. BUKER.

References Cited in the file of this patent
UNITED STATES PATENTS

| Number | Name | Date |
|---|---|---|
| 1,714,169 | Irish | May 21, 1929 |
| 1,881,813 | Meglitz | Oct. 11, 1932 |
| 1,951,908 | Hayford | Mar. 20, 1934 |